United States Patent [19]
Gilfoil et al.

[11] Patent Number: 5,769,587
[45] Date of Patent: Jun. 23, 1998

[54] BALE HANDLING APPARATUS

[75] Inventors: Gerald B. Gilfoil; Leroy Knudson; Dwayne Hayworth, all of Calgary, Canada

[73] Assignee: Whirlwind Manufacturing, Ltd., Edmonton, Canada

[21] Appl. No.: 744,034

[22] Filed: Nov. 5, 1996

[51] Int. Cl.⁶ .................................................. B60D 01/02
[52] U.S. Cl. .......................................... 414/24.5; 414/111
[58] Field of Search ................................ 414/24.5, 24.6, 414/111

[56] References Cited

U.S. PATENT DOCUMENTS

| | | | |
|---|---|---|---|
| 4,204,790 | 5/1980 | Baxter | 414/24.5 |
| 4,227,844 | 10/1980 | Love | 414/24.5 |
| 4,537,548 | 8/1985 | Lockhart | 414/111 |
| 5,071,304 | 12/1991 | Godfrey | 414/111 |
| 5,074,733 | 12/1991 | Hennig | 414/24.5 |

*Primary Examiner*—David A. Bucci
*Assistant Examiner*—Gregory A. Morse
*Attorney, Agent, or Firm*—Skjerven Morrill MacPherson Franklin & Friel; Thomas S. MacDonald

[57] ABSTRACT

A bale handling apparatus having a rigid mobile frame includes a spaced pair of longitudinal bale pickup and bale-carrying members extending substantially from front to rear of the frame forming a chute for picking-up, transporting and discharging a series of hay bales. A pulling tongue is pivotally attached to the frame at a position juxtaposed to a central portion of a frame cross member in a central portion of the frame. An arcuate rail is connected to the frame and extends over an arc angle having a bisector on the frame central longitudinal axis to an arc termini offset from axis, representative of corresponding offset positions of the frame in bale pick-up positions. A rail follower is attached to the tongue and is in moving engagement relative to the frame along the arc such that the frame is movable relative to a towing vehicle to either left-side towing or right-side towing, bale pick-up and bale-carrying positions.

14 Claims, 4 Drawing Sheets

US 5,769,587

BALE HANDLING APPARATUS

FIELD OF THE INVENTION

This invention is directed to improvements in apparatus for picking up, transporting and discharging hay bales. More particular, the improvements include towed apparatus which can pickup either large square or large round bales of hay or other agricultural products which have been previously cut and baled and left generally aligned in the mown field.

BACKGROUND OF THE INVENTION

As shown in FIGS. 1–3, taken from a prior 1980 Canadian patent 1,086,668 (Leroy Knudson), devices have been constructed and used where a mobile frame 10 includes two spaced elongated support surfaces 11, 12 extending longitudinally at the bottom of the frame for both picking up and holding rectangular bales of hay. A series of identical inverted U-shaped, transverse members 13, 14, 15, 16 and 17, each with essentially vertical side members 18, 19 interconnected by an arched base 20, support the bale support surfaces 11, 12. Interconnect members 21, 22 extend between the bale-support surfaces and the side members. Ground wheels 34, 35 are connected in tandem for rotation with respect to the frame. The frame, more particularly the bale-support surface, is capable of being lowered (FIG. 2) to a pickup ground level and raised (FIG. 3) to a transporting level by operation of hydraulic cylinders 18a, 19a. The frame 10 has a hitch means on one offset side of the frame including a tongue 52 with a support strut 54. The tongue is connected to a bottom front corner of the frame by pivot mounts 24, 27 connected to a hydraulic cylinder 47, such that the tongue can pivot about a horizontal axis defined by the pivot mounts. The distal end of tongue 52 is connected to a towing vehicle (not shown), normally a tractor. Other hydraulic means (not shown in FIGS. 1–3) are provided, as seen in the Canadian patent, for assisting in the lowering and raising of the frame and the tongue so that the tongue is positioned for towing in an offset position (FIG. 1) with respect to the towing vehicle. While the above described apparatus has had a degree of commercial success, the corner-pull mechanism has a inability to switch sides so as to pull along either the left rear side or the right rear side of the towing vehicle, that is, it has a one-sided mode of operation. This reduces mobility, and results in an inability to operate in a preferred direction of operation, particularly on slopes or near certain field obstacles. The prior art mechanism also has an inordinate stress at the tongue corner connection which can cause premature failure and/or the need for added structural members increasing the complexity, cost and weight of the frame to be towed. Further, the prior art mechanism in failure-mode operation is unpredictable and can be somewhat dangerous when there is a hydraulic or lock failure when being pulled directly behind the towing vehicle, as in a road-transport mode. The frame (trailer) unit then tends to swing out from the towing vehicle into an offset, pickup mode, tracking parallel to but displaced from the pulling track of the towing vehicle. Problems have also been encountered in the prior art pickup bottom slide-rails which have been found to have insufficient ground clearance, particularly when the bales have been flattened (by sitting too long in the field) and then jamming in the open-end of the frame.

SUMMARY OF THE INVENTION

The present invention provides for a pulling tongue for a rigid, mobile, bale pickup and handling frame which tongue is pivotally attached at a proximal end of the tongue along a central longitudinal axis of the frame, the tongue having one or more intermediate follower(s) riding on a fixed arcuate rail on the frame for pivoting the tongue and its distal end to either a frame "left offset" pickup/drop-off operation position or a "right offset" operation position. This structure provides a balanced structural rigidity of the frame and tongue on the longitudinal central axis of the frame in the central or locked road towing transport position immediately behind and on the same track as the towing vehicle for road transport.

The follower is preferably a roller, rotatively attached to the tongue which rides in a constrained-in-vertical direction along an arcuate C-cross sectioned channel fixed to the frame. The tongue and an associated pair of horizontally-operating hydraulic pistons provides for hydraulic balanced steering, where movement of one piston of one hydraulic cylinder decompresses the other piston of a second hydraulic cylinder. This allows for smaller power units to drive the tongue to a desired angular or centrally aligned position on a horizontal plane. The longer tongue movement arm requires less travel in hydraulic actuation for steering and maintenance of attitude of the towed frame to the towing vehicle. The present invention also provides a self-righting or self-steering function in a hydraulic or locking failure mode. If the hydraulics or provided pin-locks fail during road transport the default pulling angle goes to the center longitudinal axis due to the placement of the pivot pulling point of the tongue in the pulled frame at a side-to-side center and at a position in front of the trailer's wheels, and preferably in the front one-half of the pulled frame (trailer) (front to back).

In one aspect of the invention, where nominally round bales are to be picked-up (the bales normally having a diameter of from about 120 cm to about 180 cm), improved bottom slide members (skids) include flat angular surface-contacts which press into the periphery of the round bale to give a greater clearance for somewhat flattened bales. Round bales flatten by compression from their own weight when left standing over time. Using the mechanism of the invention results in the flat spot at the bottom being kept on the bottom both before and after being moved, which is desirable as it results in less alteration to the structure of the bale.

In another aspect of the invention where nominal rectangular or square bales are to be picked-up, a pair of knives are attached to the bottom slide which, during pickup, cut into opposite sides of the bale to support the bale on the knives within the mobile frame. These sides are sides which are not wrapped with binder material i.e., wire or twine or filament or strapping. As succeeding bales of either cross-sectional shape are picked up, the previously picked-up bales are pushed rearwardly by succeeding bales being picked up along either the skid or the knives, until the length of the frame is filled with multiple longitudinally aligned bales. In one embodiment the knives converge slightly from the front of the frame toward a center portion of the frame. In off-loading bales a rear stop on the frame, such as a chain is opened and the bales slide out of the rear of the frame, as the towing vehicle drives away, with the hitched mobile frame lowered to allow the bales to rest on the ground and the trailer to be driven away. The preferred method of the invention includes laying the bales, which have been picked up, in rows about 2–3 feet apart, "stacked" horizontally end-to-end, thus leaving the only surface exposed to rainfall as the upper part of the circumference of the bale (which acts sort of as a rain shedding "roof" surface). This is desirable as it has been shown in studies to result in less wastage of the stored bales than other stacking methods and less even than covering the bales with tarps. The preferred method of unloading is to drive the trailer up to butt the front bale on the load into the "back" of the row, then to lower the trailer's rails, lower at the rear than the front, but essentially resting the bales on the ground, and then back the trailer away from the "parked" bales, leaving a row with no gaps in the end-to-end arrangement. Thus, the "steerability" of the moveable tongue, and the width of the wheel bogie and height adjustment mechanism on the wheel sides of the trailer are important to allow this type of unloading technique to be done with ease by one operator using a standard farm vehicle (truck or small tractor) resulting in no need for front-end loaders at both ends of the trip.

There is no locking pin at the extreme outside end of the swing-arc of the steerable tongue. This results in on-the-fly steerability. The operator typically has one hand on the steering wheel of the towing vehicle, feet controlling throttle and brakes, with the other hand on the three hydraulic control levers wheel-frame height (altitude), tongue height (pitch) and tongue direction (side-to-side steering). In this way, the operator maintains fine control over the trailer's behavior, and can pickup large bales at high speeds (20+ km/hour).

A pin lock is provided for locking the tongue at a central axis for towing. In a further embodiment the distal end of the tongue and the mobile frame's front-end can be raised or lowered by placing a vertically adjustable hydraulically raised (or lowered) hitch on the distal end of the tongue. This provides for a stronger, safer, faster hitch connection with less power needed for connection to the towing vehicle.

The bale handling apparatus of the invention includes a rigid mobile frame having a front end, a rear end and a central portion, and including a spaced pair of longitudinal bale pickup and bale-carrying members extending substantially from the front end to the rear end of the frame and a series of cross-members extending generally traversely above and between the pickup and carrying members, the frame forming a chute for recovering a series of hay bales. A pulling tongue is pivotally attached at its proximal end to the frame at a position juxtaposed to a central portion of a first one of the cross-members in a central portion of the frame. A pin lock is located along a central longitudinal axis of the frame for locking the tongue in a road-tow position of the tongue. An arcuate rail is connected to the frame and extends over an arc angle having a bisector on the central longitudinal axis, to an arc termini offset from axis, representative of corresponding offset positions of the frame in bale pick-up positions. A rail follower is attached to the tongue and is in moving engagement along the arc such that the frame is movable relative to a towing vehicle to either a left-side towing or right-side towing, bale pick-up, drop-off and bale-carrying position.

DETAILED DESCRIPTION

Figure 1:
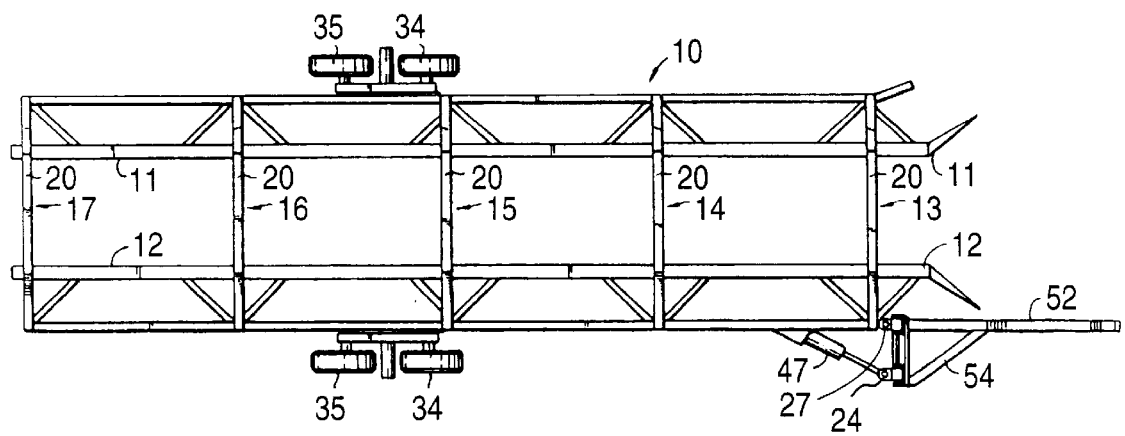
FIG. 1 is a top view of a prior art apparatus.
Figure 2:
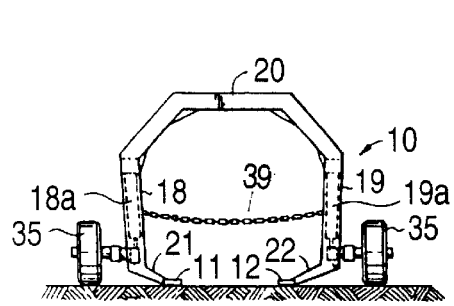
FIG. 2 is an end view thereof in a lowered, bale pickup mode of operation.
Figure 3:
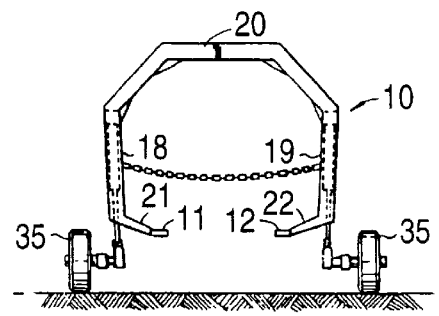
FIG. 3 is an end view thereof in a raised, bale transport mode of operation.
Figure 4:
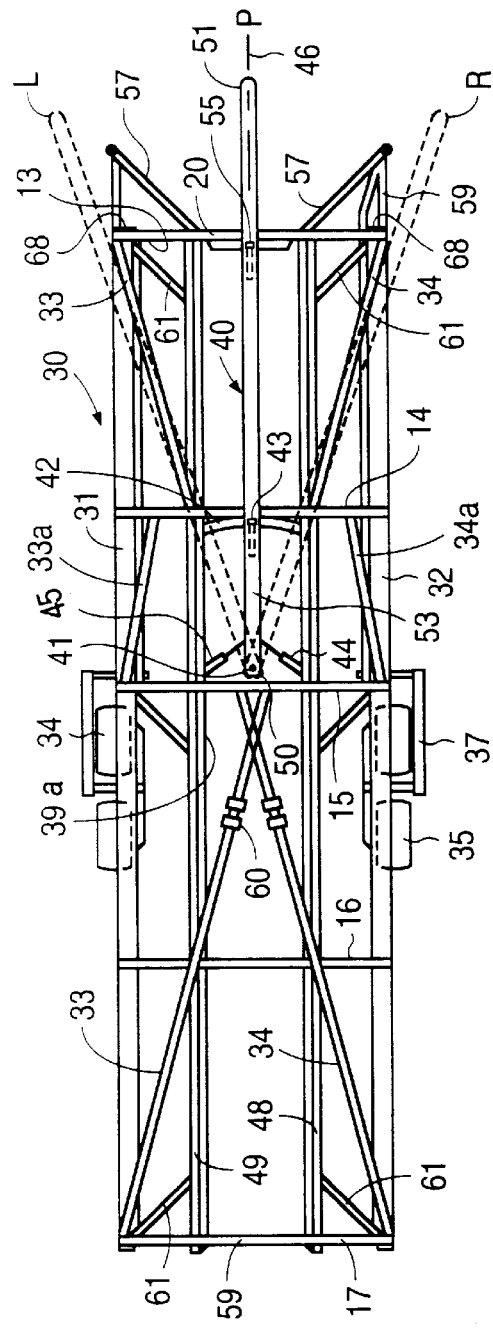
FIG. 4 is a top view of the mobile frame of the invention showing a central pivoted tongue in dashed line offset bale-pickup positions.
Figure 5:
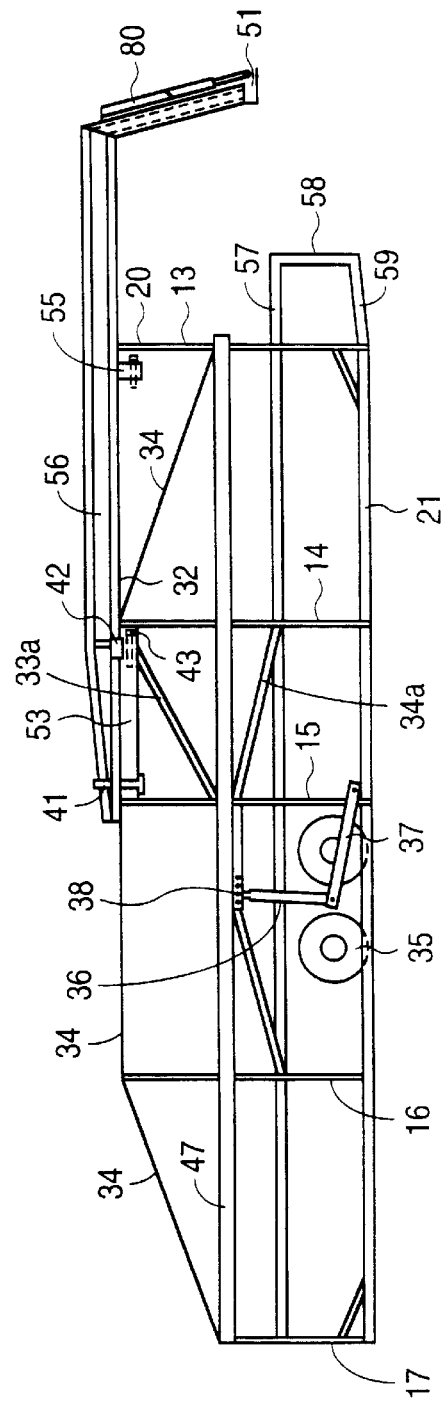
FIG. 5 is a side view thereof.

The device shown in FIG. 4–15 includes some structural elements which are basically the same as in the device of FIGS. 1–3. In such case the same numeral denotes the same part. As seen in FIGS. 4 and 5, mobile bale pick-up frame 30 includes a pair of bale-supporting skids 48, 49 extending rearwardly from a front inverted U-shaped frame 13 to a rear stop 39. The stop may be a chain as in FIGS. 2 and 3, extending across an open chute forming a passageway for a succession of picked-up bales. The frame includes upper longitudinal spaced side beams 31, 32 extending from an approximately mid-point of the frame 30 to the front of the frame, a pair of lower longitudinal spaced side beams 21 extending the length of the frame 30 and a pair of intermediate longitudinal spaced side beams 47 also extending the length of the frame 30. A pulling tongue 40 having a pivoted proximal end 50 and a distal end 51 extends in a road-transport pulling mode of operation P along a central longitudinal axis 46 of the frame.

A locking pin connection 55 locks tongue 40 with respect to the arched beam 20 of the inverted U-shaped member 13 during the road-transport pulling mode of operation P. The pin connection 55 may be a pin and eye locking mechanism where the pin, in the preferred embodiment, is permanently located in a sleeve mounted on the tongue, and which when desired can be inserted and locked into a corresponding hole in the frame when the tongue is in its longitudinally centered position, the locking pin mechanism being of common and well-known design. The locking pin in a preferred embodiment is a tube welded to the bottom of the tongue, spring-loaded to normally be retracted, with a method of extending the pin and locking it into place in a hole in the frame of the machine which hole is aligned with the pin when the tongue is centered. It was found that having the pin in the frame pointing up into a hole in the tongue intruded into the space where the bales go, and was subject to damage. If the pin was mounted on the tongue, pointing down, it was hard to reach. The locked tongue then contributes longitudinal structural strengthening to the mobile frame 30. Upon unlocking the tongue 40 is pivotable about pivot pin 41 which fits in an aperture at a rear end of a locking piece 53 extending centrally between inverted U-shaped members 14 and 15. A front end of locking piece 53 includes an arcuate rail 42 of block C-cross section extending vertically and receiving a tongue follower 43, preferably a rotatable roller, depending from the tongue 40. A pair of hydraulic cylinders 44, 45 (not shown in FIG. 5) are pivotally anchored to beams 39 allowing for a very small arcuate movement, and the pistons of each cylinder are pivotally mounted to the tongue 40 such that upon compression of one piston and extension of the other piston, the tongue is moved about pivot 41 to any position between the dashed line positions R (right hand offset bale pickup position behind the towing vehicle) and L (left hand offset bale pickup position behind the towing vehicle). A pair of cross beams (or guy wires) 33, 34 extend across and on the upper surfaces of arches (vertical ribs or hoops) 20. Turnbuckles 60 are provided on cross wires or straps 33, 34 for adjustment and alignment and to ensure greater structural rigidity. Braces 61 also may be included at each end of the frame. Support tubes 33a and 34a brace frames 14 and 15 and extend outwardly of the L and R positions of tongue 40.

Wheel sets of two pairs of tandem ground wheels 34, 35 as in FIGS. 1–3 support the frame 30. The wheels can retract to above the rails 21 for servicing and drop-off purposes, and can extend to raise the rails typically 2.5 ft above ground to provide clearance and suitable "attitude" adjustments to the "pitch" of the rails relative to level, front-to-back or nose-to-tail relative height/altitude. A hydraulic cylinder 36 is pivotally secured to a bracket 38 or beam 47 and the cylinder piston pivotally secured to a bracket (not shown) connected to a bogie member 37 mounting the ground wheels. Box trusses 57, 58 and 59 act as a guide-bar at each side of the "entrance" to the tube or chute formed by the ribs or hoops, and acts to funnel or guide the bales into the conveyance allowing the operator to move the vehicle at relatively high speed typically 20 km/hr. "Self-righting" or self-steering is provided such that in failure mode (if the hydraulics fail or the pin-lock fails during road transport mode), the default pulling angle goes to the center due to placement of pin in the towed vehicle's side-to-side center axis 46 and in the front half of the towed vehicle's frame (front to back) in front of the wheels.

Figure 6:
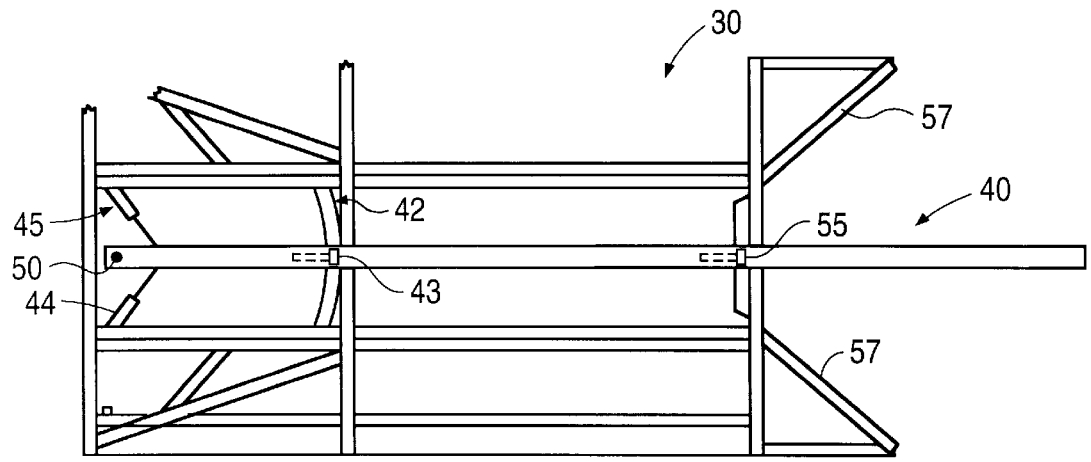
FIG. 6 is a top, more detailed view of the tongue and tongue-pivoting portion of the mobile frame of the invention.
Figure 7:
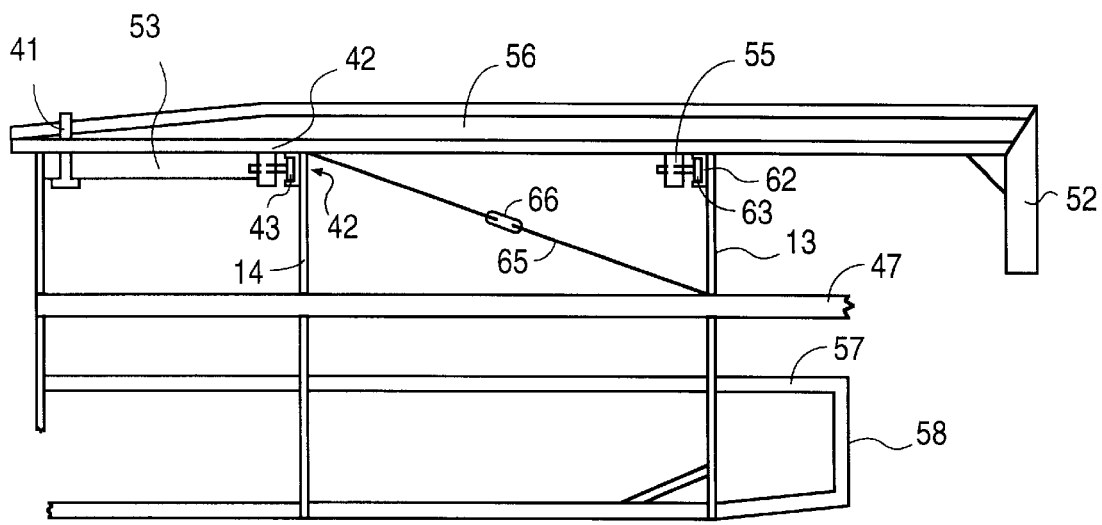
FIG. 7 is a side view thereof.

As seen in FIGS. 6 and 7 the hydraulic cylinders 44, 45 shift the tongue 40 along the arcuate rails on curved track 42 by roller 43 (follower) extending downwardly on brackets 64 from tongue 40. Similar tracks 62 and rollers 63 may extend proximate to rib 13 for further supporting the tongue 40 on frame 30. An additional wire rope or strapping 65 with a turnbuckle 66 may extend at a diagonal between ribs 13 and 14 to aid in alignment adjustments (as needed) and structural rigidity.

Locking of the tongue 40, more particularly an intermediate portion 56, to the front inverted U-shape transverse number or hoop 13 is done when an operator desires to tow the frame in a road-transport mode of operation with the tongue 40 aligned along the frame longitudinal axis 46 (FIG. 4). The locking mechanism includes a locking pin mounted in a sleeve tube on the tongue which slides into a hole in the frame when the tongue is centered, and a mechanism which holds the pin in place (thus locking the tongue in center. Locking of the tongue, is really only necessary if there was a load on the trailer and the operator is driving some considerable distance, since the trailer tracks the tow vehicle even without the hydraulics being on. The long length (or moment arm) of the tongue 40 requires less travel of the hydraulic actuators 44, 49 for steering and maintenance of the attitude of the mobile frame with respect to the towing vehicle. The tongue is also designed to be long enough to (just) allow the trailer, when steered from side to side behind the towing vehicle, to clear the back corners of the towing vehicle when the trailer swings in an arc from center to side for pickup or drop-off operation.

Figure 8:
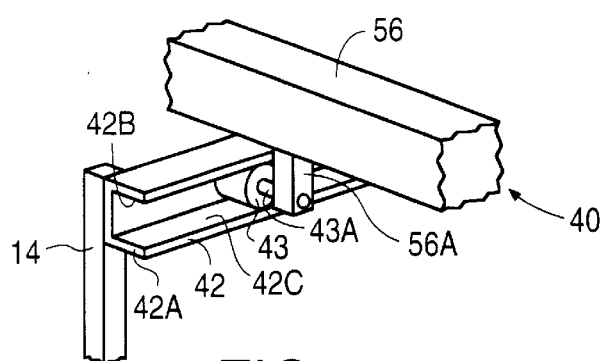
FIG. 8 is a schematic perspective view of the tongue follower (roller) and C-cross-section arcuate rail attached to the frame.

FIG. 8 illustrates the detail of the arcuate rail 42 with a C-cross-section 42a which is fixedly connected to hoop 14 and extends in this embodiment in an arc of about 20° from each side of the frame longitudinal axis 46 i.e. a total arc length of about 40° with the axis 46 acting as a bisector of the arcuate rail. A follower in the form of a roller 43 is connected by axle 43A to a bracket 56A depending from tongue 40 at portion 56 to ride on the bottom 42C of rail 42. The upper part 42B of rail acts as a guide surface to constrain the follower and the tongue from moving vertically while allowing arcuate horizontal movement, thus forming a longitudinal structural member as well as being the trailer's steerable tongue.

Appropriately routing of electrical trailer light/brake wiring and hydraulic lines is provided along of the tongue for supplying actuation and hydraulic shifting of the tongue and for the raising and lowering of the tandem wheels. This allows for easy protection of electrical and hydraulic conduits (controlling tongue height, tongue direction and wheels retraction/extension), ease of repair and inspection and, being at a raised position, are out of harms way. In the 1980 patent prior art device the conduits were mounted on the sides of the frame to the wheel bogies and to the hydraulic cylinders where they could be easily damaged.

Figure 9:
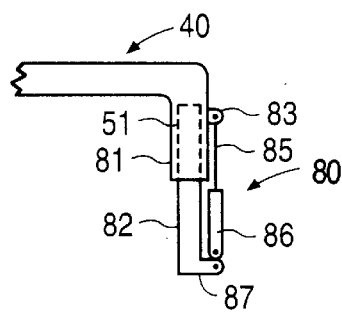
FIG. 9 is a side view of an improved tongue-to-towing vehicle hitch of the invention.

FIG. 9 illustrates an improved device for raising and lowering the front end of mobile frame 30 by utilizing an adjustable hydraulically raised (and lowered) hitch 80 on the distal end 51 of the tongue 40. The hitch includes a cylindrical, square or rectangular tube extension 81 within another tube of greater diameter forming a telescope tongue riser. A vertically movable rod or cylinder tube 82 is thus telescopically movable but with rather tight (less than 3 mm) tolerance within tube extension 81. A bracket 83 is welded or otherwise affixed to an upper portion of extension 81 and a piston rod 85 fixedly attached thereto. The piston rod and associated piston (not shown) extends into a hydraulic cylinder 86 which is pin affixed to a bracket 87 extending horizontally from a bottom section of rod 82. Hydraulic actuation of the piston moves rod up and down so that the trailer frame can be tilted from front to back on the pivot point of the wheel's bogie system, allowing the operator to raise and lower the opening at the front and back of the trailer to respectively load and unload bales, shift loads, and the like. The lower end of the extension tube or rod 82 (51 at FIG. 5 and 87 at FIG. 10) holds a conventional hitch mechanisms such as (but not necessarily or limited to) a socket to mate with a ball on the towing vehicle. Due to this construction the hitch elements 82 and 84 are always under compression. This provides for a safer, stronger and better hitch which is easily adjustable dependent on the vertical height of the hitch mounting on the towing vehicle. In the prior art, Canadian patent the lowering and raising of the hitch was accomplished by a hydraulic cylinder with the pivoted elements always in tension. In addition the socket (for example) rests in a relatively unchanged attitude (or pitch angle) regardless of the pitch angle the operator chooses for the tongue, and thus the trailer, by extending or retracting the extension 82 in the tube 81 by actuation of the hydraulic piston 86. This is unlike the prior art where the socket (for example) was mounted on a substantially horizontal member, the pitch of which changed directly with the pitch of the trailer chosen by the operator, thus tilting or pitching the socket (or other hitch arrangement) out of its optimal level. The hydraulic arrangement allows one person operation of the hitching and unhitching of the trailer from the vehicle.

Figure 10:
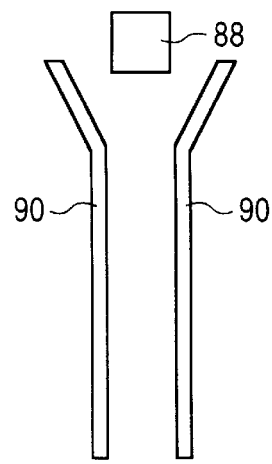
FIG. 10 is a schematic top view of the bale-holding knives of the invention.

FIG. 10 illustrate the entrance of the chute formed by the knifes 90 or skids 48, 49 which in top view diverge at the front of the frame adjacent to hoop 13 so that a bale 88 can be more easily picked-up by the mobile frame.

Figure 12:
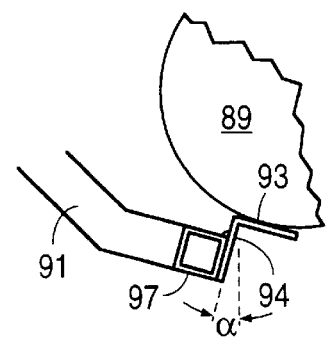
FIG. 12 is an end view of the bale skid and bale interface.
Figure 11:
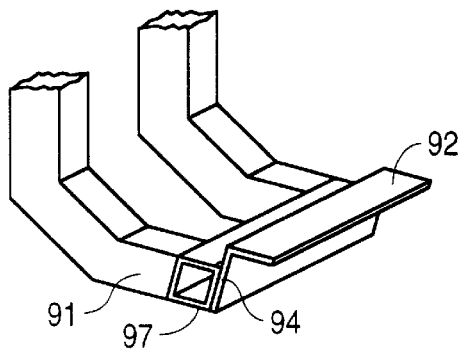
FIG. 11 is a schematic perspective view of the improved bale skid of the invention.

FIG. 11 shows an improved skid 91 where a longitudinal rail 92 in the form of a 4"×4 " right angle/steel angle-iron 94 bar is welded to a hollow square 3"×3" steel tube 97 welded to the skid. A continuous weld bead at the top seals against rain and moisture. The bottom of the tube can be spot-welded at 1–2 foot intervals. As seen in FIG. 12 the rail 92 has a flat surface 93 which is about 1" higher than the tube, and faces, abuts and supports a round bale 89. This provides a friction surface over a larger interface area resulting in less wear, less drag and less bale damage from the point friction previously occasioned by the 90° lip 94 (of the skid 91) without the addition of the rail 92. This also keeps the bale from hitting the ribs 14. A 10°–15° offset α from vertical of the square tube coincides with the tangent of the bale's circumference at the bale lift point.

Figure 13:
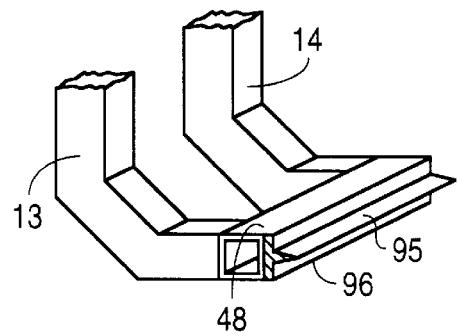
FIG. 13 is a schematic perspective view of the knife blade-containing skid embodiment.
Figure 14:
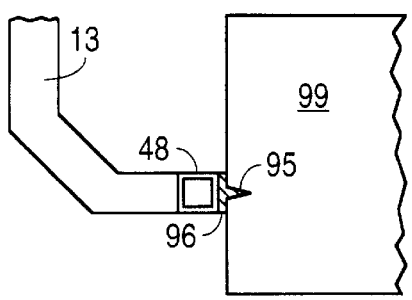
FIG. 14 is an end view of a rectangular bale and knife blade interface.
Figure 15:
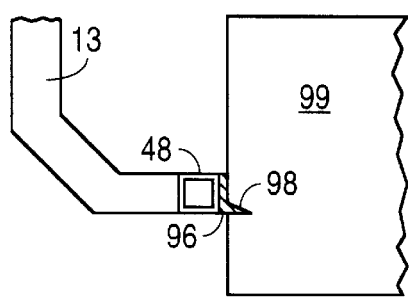
FIG. 15 is an end view of a second embodiment of the bale and knife blade interface.

FIGS. 13–15 illustrate a skid blade or knife which is fixed between successive ribs 13, 14, 15, 16 and 17 of frame 30 (FIG. 4). A blade or knife 95 extends horizontally from each of the skids 48, 49 such that as a square bale 99 is picked up (with the frame in a lowered position as in FIG. 2), the knives on each side cut into the side of a square bale 99 and holds each bale from the time it enters the frame chute until the last of a series of bales fill the chute between hoops 13–17. When the stop 39 is opened (the chain is removed) and the towing vehicle is moved forwardly with the frame lowered for unloading, each of the bales will be dragged and dropped behind the mobile frame dropping off the pair of side knives. Conversely, the trailer can be backed away from the bales to unload in either the round or square bale embodiments. The bales merely slide along the knives in loading and in drive-away off loading. FIG. 14 illustrate the use of a sidewards T-configuration with a vertically spaced knife edge 95 and FIG. 15 a single knife edge 98 in an L-configuration with a vertical connect piece 96 attached to the end of skid 48.

The above description of the preferred embodiments of this invention is intended to be illustrative and not limiting. Other embodiments of this invention will be obvious to those skilled in the art in view of the above disclosure.

We claim:

1. A wheeled bale handling apparatus comprising:
   a rigid mobile frame having a front end, a rear end and a central portion, said frame including a spaced pair of longitudinal bale pickup and bale-carrying members extending substantially from said front end to said rear end and a series of cross-members extending generally traversely above and between said pickup and carrying members, said frame forming a chute for recovering a series of hay bales or the like;
   a pulling tongue pivotally attached at a proximal end of said tongue to said frame at a position juxtaposed to a central portion of a first one of the cross-members in a central portion of the frame;
   a first lock in said frame and located along a central longitudinal axis of said frame for locking said pulling tongue in a road-tow position of said pulling tongue;
   an arcuate rail connected to said frame and extending over an arc angle having a bisector on said central longitudinal axis and extending to an arc termini offset from said central longitudinal axis representative of corresponding offset positions of said frame in bale pick-up positions; and
   a rail follower attached to said pulling tongue, said follower being in moving engagement along said arc such that said frame is movable relative to a tow vehicle to either a left-side towing or right-side towing bale pick-up and bale-carrying position.

2. The apparatus of claim 1 wherein said cross-members are of an inverted U-shape having depending legs each including an inwardly-directed bottom skid extending longitudinally of said frame, said bottom skids adapted for supporting a bale within said frame.

3. The apparatus of claim 2 wherein said bale is a rectangular bale and each of said skids include at least one knife extending rearwardly along said frame and generally parallel to a ground surface on which the rectangular bale rests prior to pick-up, such that pulling movement of said frame relative to the bale permits the knifes to cut into peripheral sides of the rectangular bale to support the rectangular bale in the frame.

4. The apparatus of claim 3 wherein successive ones of said rectangular bales are picked-up by said knifes and previously picked-up rectangular bales are moved along successive portions of said knifes extending rearwardly along said frame.

5. The apparatus of claim 4 wherein said knifes converge from the front end of said frame toward the central portion of said frame.

6. The apparatus of claim 2 wherein the bale is a round bale and said skids include an angular surface facing and supporting a round bale in said frame.

7. The apparatus of claim 2 wherein as each bale of a series of bales are picked-up by said bottom skid, previously picked-up bales are moved rearwardly in said frame along said bottom skid.

8. The apparatus of claim 1 further including a first hydraulic cylinder and piston attached between said frame and said tongue on one side of said central longitudinal axis and a second hydraulic cylinder and piston attached between said frame and said tongue on the other side of said central longitudinal axis and wherein said first and second hydraulic cylinders and pistons are operable such as to drive said tongue in a horizontal plane arc in one or another direction along said rail arc.

9. The apparatus of claim 8 wherein said tongue is pivotally attached to said frame at a position in front of a position in front of the apparatus wheels and in front of a position representing one-half the length of said frame from said front end to said rear end, such that in the event of hydraulic failure of said first and second hydraulic cylinders, a default pulling angle and tongue attitude is at the central longitudinal axis of said frame.

10. The apparatus of claim 9 wherein said C-channel is vertically-oriented and said roller rolls in a horizontal arc along a bottom interior surface of said C-channel.

11. The apparatus of claim 1 wherein said rail arc comprises a C-channel attached to said frame and said rail follower is a roller rotatively connected to said tongue and rollable in said C-channel.

12. The apparatus of claim 1 further comprising a second arcuate rail connected to said frame adjacent to said first lock and a second rail follower on said tongue movable along said second arcuate rail, said second arcuate rail and said second rail follower being adjacent to the front end of said frame.

13. The apparatus of claim 1 wherein said pulling tongue includes a front end having an angularly depending first tube, a second movable tube telescoped in said first tube, a vehicle hitch fixedly connected to said second tube and a hydraulic cylinder and piston connected between said hitch and said first tube for placing said tubes in compression and for adjusting the ground-height of said hitch for connection with the tow vehicle to allow single-handed vehicle connection, as well as for adjustment of the attitude or pitch angle of the trailer pivoting on a wheel bogie systems axle.

14. The apparatus of claim 1 further including at least one pair of ground support wheels rotatively attached to said frame and including a hydraulic mechanism for adjusting the height of the pair of wheels, wherein said rail follower is driven by a hydraulic drive and wherein hydraulic tubing to said hydraulic mechanism and to said hydraulic drive is positioned on said tongue and extending front to back to aid in the adjustment of the height and attitude of the bale pickup and bale carrying members for pickup, transport and loading, as well as the attitude or pitch angle of the frame to aid in pickup, placement and unloading of the bales.

* * * * *